(12) United States Patent
Ooizumi et al.

(10) Patent No.: US 8,606,065 B2
(45) Date of Patent: Dec. 10, 2013

(54) OPTICAL FIBER AND METHOD FOR FABRICATING THE SAME

(75) Inventors: Haruo Ooizumi, Hyogo (JP);
Masatoshi Tanaka, Hyogo (JP);
Masayoshi Hachiwaka, Hyogo (JP);
Takaharu Kinoshita, Hyogo (JP);
Mamoru Hashimoto, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 308 days.

(21) Appl. No.: 13/121,361

(22) PCT Filed: Aug. 21, 2009

(86) PCT No.: PCT/JP2009/004019
§ 371 (c)(1),
(2), (4) Date: Mar. 28, 2011

(87) PCT Pub. No.: WO2010/035397
PCT Pub. Date: Apr. 1, 2010

(65) Prior Publication Data
US 2011/0176783 A1    Jul. 21, 2011

(30) Foreign Application Priority Data

Sep. 26, 2008 (JP) .................................. 2008-248197
Oct. 31, 2008 (JP) .................................. 2008-281471

(51) Int. Cl.
*G02B 6/036* (2006.01)
(52) U.S. Cl.
USPC ......................................................... 385/127

(58) Field of Classification Search
USPC .......................................................... 385/127
See application file for complete search history.

(56) References Cited

U.S. PATENT DOCUMENTS

| 2004/0264896 A1 | 12/2004 | Takahashi et al. |
| 2006/0039665 A1 | 2/2006 | Matsuo et al. |
| 2007/0003198 A1* | 1/2007 | Gibson et al. ................. 385/123 |
| 2008/0050079 A1* | 2/2008 | Lee et al. ...................... 385/127 |

FOREIGN PATENT DOCUMENTS

| JP | 56-059638 | 5/1981 |
| JP | 63-121807 | 5/1988 |
| JP | 2001-240424 | 9/2001 |
| JP | 2002-528757 | 9/2002 |
| JP | 2005-17694 | 1/2005 |
| JP | 2007-031194 | 2/2007 |

(Continued)

OTHER PUBLICATIONS

Japanese Office Action; Application No. 2008-281471; Sep. 8, 2009.

(Continued)

*Primary Examiner* — Sung Pak
(74) *Attorney, Agent, or Firm* — Knobbe Martens Olson & Bear LLP

(57) ABSTRACT

An optical fiber (10) includes: a core (11); a first cladding (12) surrounding the core (11) and having a lower refractive index than the core (11); and a second cladding (13) surrounding the first cladding (12) and having a lower refractive index than the first cladding (12). The first cladding (12) is doped with light attenuating dopant so that a concentration of the light attenuating dopant in the first cladding (12) increases from an inner surface of the first cladding (12) toward an outer surface of the first cladding (12).

9 Claims, 4 Drawing Sheets

(56) References Cited

FOREIGN PATENT DOCUMENTS

| JP | 2007-134626 | 5/2007 |
| WO | WO 0025091 | 5/2000 |
| WO | WO 2004/092794 | 10/2004 |

OTHER PUBLICATIONS

International Search Report; Application No. PCT/JP2009/004019; Sep. 15, 2009.
Notice of Reasons for Rejection from JPO 2008-281471; Nov. f30, 2010.

\* cited by examiner (a) FUNDAMENTAL MODE  (b) HIGHER-ORDER MODE (a)

(b)

(c)

OPTICAL FIBER AND METHOD FOR FABRICATING THE SAME

CROSS-REFERENCE TO RELATED APPLICATIONS

This application is the U.S. National Phase under 35. U.S.C §371 of International Application PCT/JP2009/004019, filed Aug. 21, 2009, which claims priority to Japanese Patent Application No. 2008-248197, filed Sep. 26, 2008, and Japanese Patent Application No. 2008-281471, filed Oct. 31, 2008. The International Application was published under PCT Article 21(2) in a language other than English.

TECHNICAL FIELD

The present invention relates to optical fibers each including a core, a first cladding, and a second cladding, and methods for fabricating the same.

BACKGROUND ART

Not only optical fibers each having a two-layer structure including a core and a cladding, but also optical fibers each including a plurality of claddings and exhibiting lower bending loss have been put into practice.

PATENT DOCUMENT 1 describes a single-mode optical fiber including a highly absorbent outer cladding glass made of quartz glass doped with cobalt oxide using a solution of cobalt oxide, a non-absorbent inner cladding glass, and a non-absorbent core glass.

CITATION LIST

Patent Document
PATENT DOCUMENT 1: Japanese Translation of PCT International Application No. 2002-528757

SUMMARY OF THE INVENTION

An optical fiber of the present invention includes: a core; a first cladding surrounding the core and having a lower refractive index than the core; and a second cladding surrounding the first cladding and having a lower refractive index than the first cladding, wherein the first cladding is doped with a light attenuating dopant so that a concentration of the light attenuating dopant in the first cladding increases from an inner surface of the first cladding toward an outer surface of the first cladding.

A method for fabricating the optical fiber according to the present invention is directed to a method for fabricating the optical fiber of the present invention by drawing a preform including a core forming portion, a first cladding forming portion surrounding the core forming portion, and a second cladding portion surrounding the first cladding forming portion. The method includes: forming the first cladding forming portion, and then introducing a light attenuating dopant from an outer surface of the first cladding forming portion into the first cladding forming portion.

BRIEF DESCRIPTION OF THE DRAWINGS

FIG. 1 is a perspective view of the structure of an optical fiber according to an embodiment.
FIG. 2 is a diagram illustrating the refractive index profile of the optical fiber of the embodiment along the diameter of a fiber cross section.
FIG. 3 is a diagram illustrating propagation of optical signals through the optical fiber of the embodiment.
FIG. 6 is a diagram illustrating propagation of optical signals through a conventional optical fiber.
FIG. 7 is a diagram illustrating fluctuations in the light intensity of an optical signal in the fundamental mode.

DESCRIPTION OF EMBODIMENT

Figure 1:
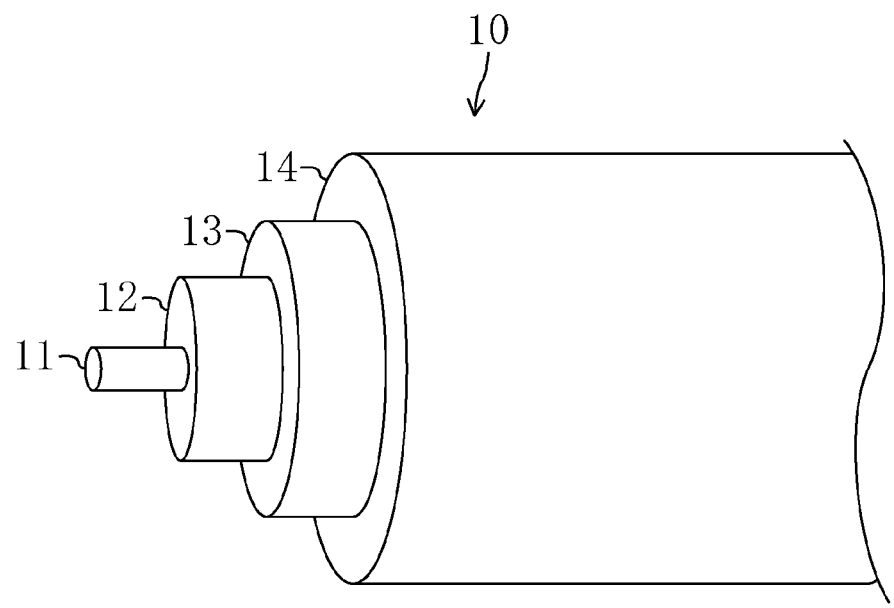
[FIG. 1]

An embodiment will be described below in detail with reference to the drawings. FIG. 1 illustrates an optical fiber 10 according to this embodiment. The optical fiber 10 is for communications, is connected with, e.g., a single-mode optical fiber branching from an optical fiber cable, and is placed, particularly, at the location where the optical fiber 10 should be bent.

The optical fiber 10 according to this embodiment includes a core 11, a first cladding 12, a second cladding 13, and a support layer 14 which are arranged sequentially from the fiber core. The core 11, the first cladding 12, the second cladding 13, and the support layer 14 are concentrically assembled together.

The core 11 is made of, e.g., quartz doped with dopant serving to increase the refractive index of the doped material, and has an outer diameter of 8-10.2 μm (preferably 8.2-10 μm) and a refractive index of 1.460-1.462. The refractive index herein denotes the refractive index for standard air at room temperature.

Examples of the dopant serving to increase the refractive index of the doped material include, typically, germanium (Ge), and otherwise phosphorus (P). The quartz may be doped with a single dopant serving to increase the refractive index of the doped material. Alternatively, the quartz may be doped with multiple dopants serving to increase the refractive index of the doped material. The concentration of such a dopant or dopants is preferably 2.9-4.0% by mass.

The first cladding 12 is made of, e.g., quartz doped with light attenuating dopant, and has an outer diameter of 30-45 μm (preferably 30-40 μm) and a refractive index of 1.450-1.454. The ratio of the outer diameter of the first cladding 12 to the outer diameter of the core 11 is preferably 2.9-5.5.

Examples of the light attenuating dopant include hydroxyl groups (OH) and hydrogen ($H_2$). Among these examples, OH is preferable because light absorption in OH can be easily controlled. The quartz may be doped with a single light attenuating dopant. Alternatively, the quartz may be doped with multiple light attenuating dopants.

The quartz is doped with the light attenuating dopant so that the concentration of the light attenuating dopant in the first cladding 12 is modulated to continuously increase from the inner surface of the first cladding 12 toward the outer surface thereof. The average concentration of the light attenuating dopant in the first cladding 12 is preferably 100-10000 ppm by mass.

The second cladding 13 is made of, e.g., quartz doped with dopant serving to decrease the refractive index of the doped material, and has an outer diameter of 44-75 μm and a refractive index of 1.430-1.444.

Examples of the dopant serving to decrease the refractive index of the doped material include boron (B) and fluorine (F). The quartz may be doped with a single dopant serving to decrease the refractive index of the doped material. Alternatively, the quartz may be doped with multiple dopants serving to decrease the refractive index of the doped material. The concentration of such a dopant or dopants in the second cladding 13 is preferably 2.0-25% by mass.

The support layer 14 is made of, e.g., pure quartz, and has an outer diameter of 123-127 μm (typically 125 μm) and a refractive index of 1.450-1.454.

The optical fiber 10 having the above structure and coated with an unillustrated coating layer made of resin is used as a coated optical fiber.

Figure 2:
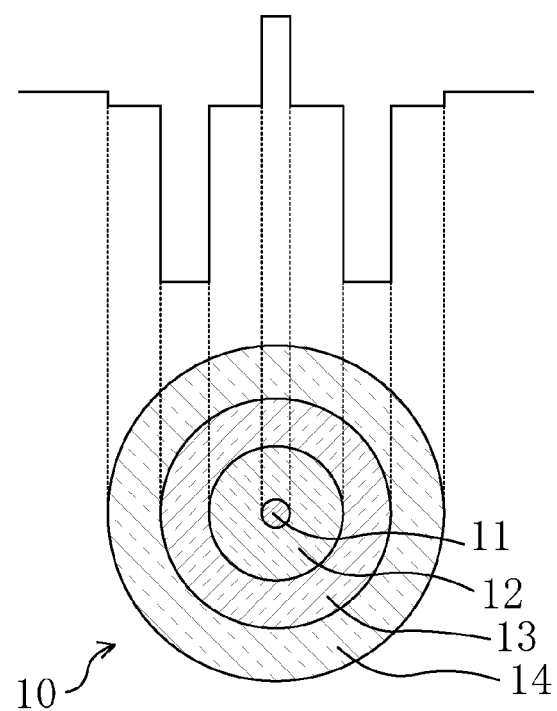
[FIG. 2]

FIG. 2 illustrates the refractive index profile of the optical fiber 10 of this embodiment along the diameter of a fiber cross section.

When the refractive indexes of the first cladding 12 and support layer 14 (which are preferably identical) of the optical fiber 10 of this embodiment are used as references, a portion of the refractive index profile corresponding to the core 11 is convex upward, and corresponds to a portion of the optical fiber 10 having a higher refractive index than the references. In contrast, a portion of the refractive index profile corresponding to the second cladding 13 corresponds to a portion of the optical fiber 10 having a lower refractive index than the references, and has a trench structure in which the portion of the refractive index profile is strongly concave downward. Even when the optical fiber 10 is bent to a small radius of curvature, the above-described structure of the optical fiber 10 advantageously reduces light leakage outside the second cladding 13.

Figure 6:
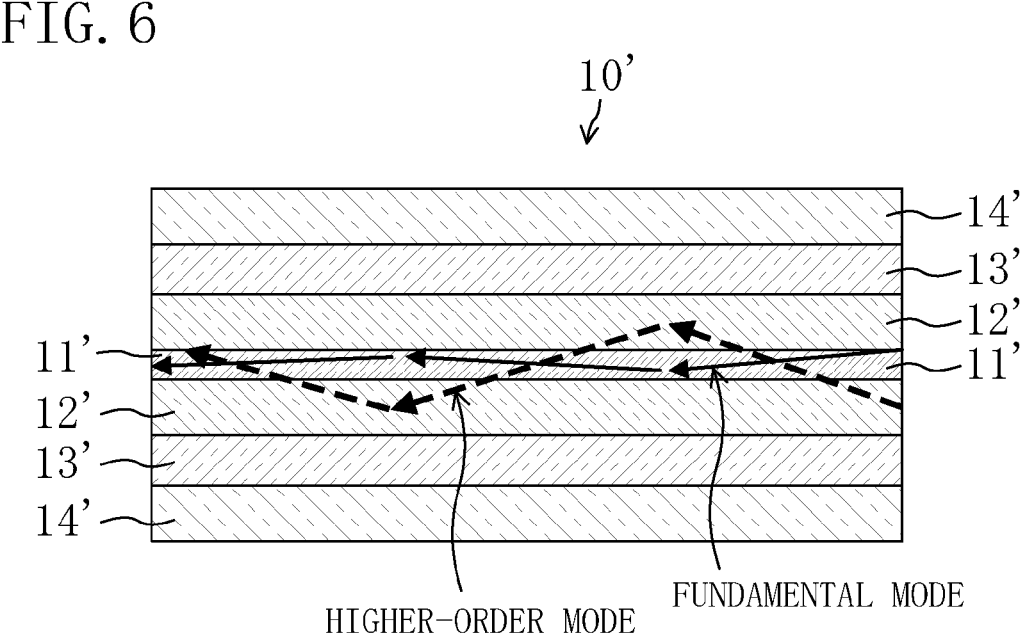
[FIG. 6]
Figure 7:
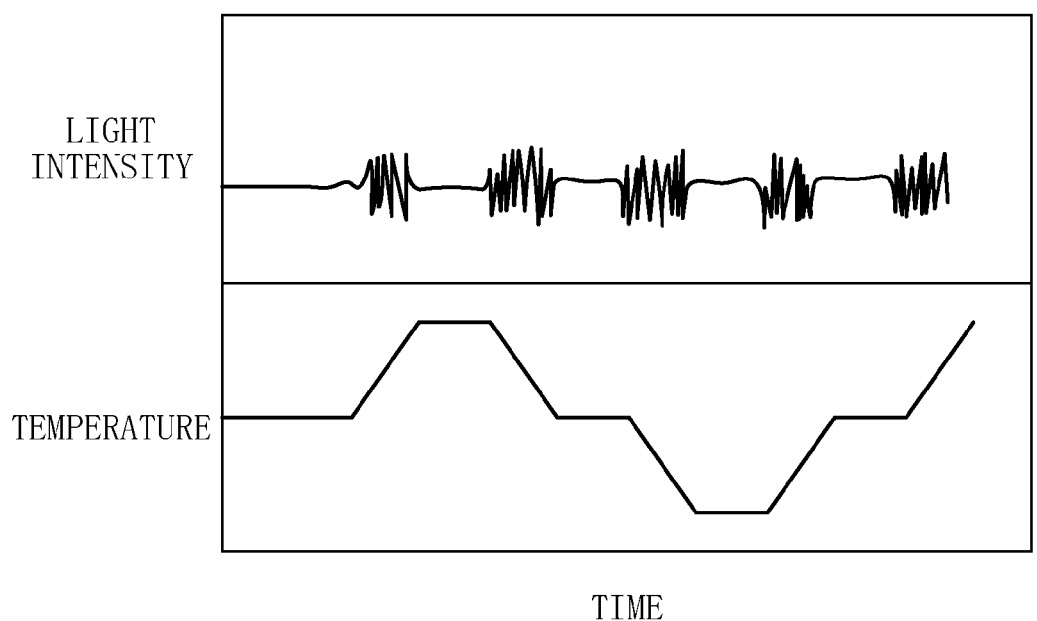
[FIG. 7]

Incidentally, when an optical fiber including a plurality of cladding layers is connected with a typical communications single-mode optical fiber, axial misalignment of a core of the optical fiber may be caused. In this case, as illustrated in FIG. 6, an optical signal in the fundamental mode propagates principally through the core 11' while an optical signal in a higher-order mode is generated in the cladding 12' surrounding the outer surface of the core 11' and propagates through the optical fiber. As illustrated in FIG. 7, for example, with temperature change, the phase difference between the fundamental mode and the higher-order mode changes, leading to a mode interference therebetween. This causes fluctuations in light intensity of an optical signal at the exit end of the fiber. The mode interference is caused, depending also on the fiber length and the wavelength of the optical signal.

Figure 3:
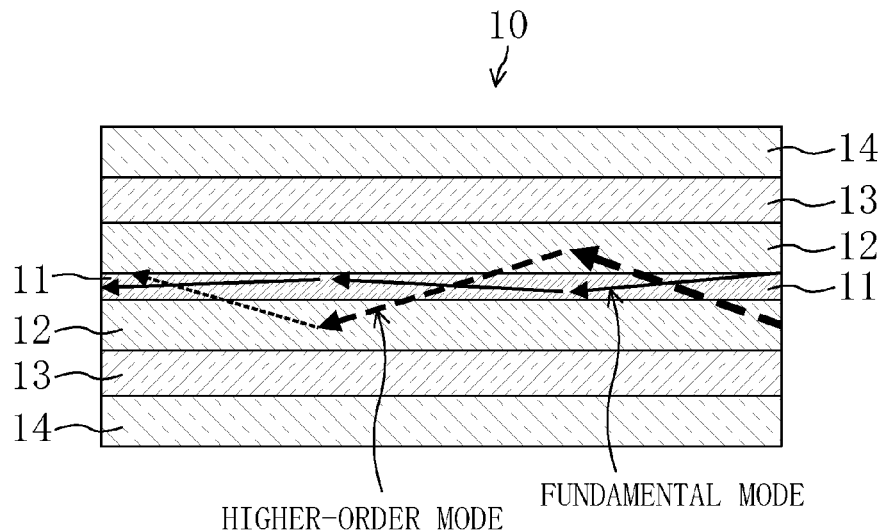
[FIG. 3]
Figure 4:
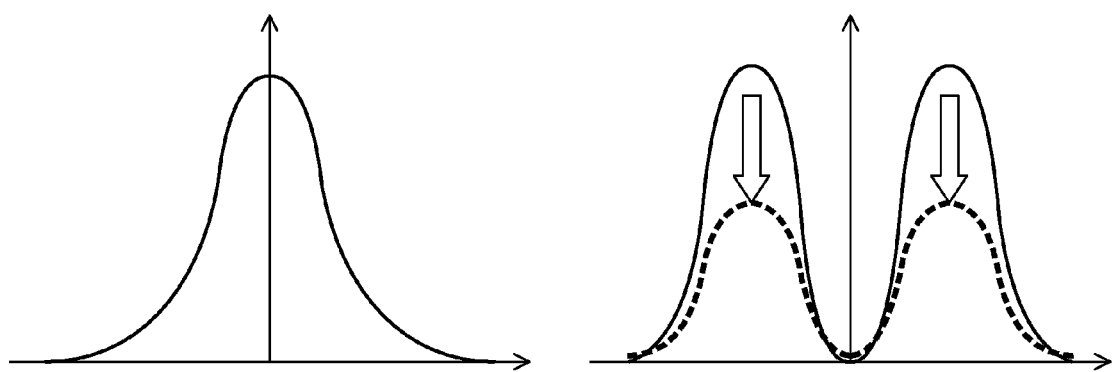
[FIG. 4] FIG. 4($a$) is a light intensity profile of an optical signal in a fundamental mode, and FIG. 4($b$) is a light intensity profile of an optical signal in a higher-order mode.

However, assume the following: when the optical fiber 10 of this embodiment is connected with another single-mode optical fiber, axial misalignment of the core 11 is caused; and as illustrated in FIG. 3, an optical signal in the fundamental mode propagates principally through the core 11 while an optical signal in the higher-order mode is generated in the first cladding 12 and propagates through the optical fiber 10. Even in this case, since the first cladding 12 is doped with light attenuating dopant so that the concentration of the light attenuating dopant in the first cladding 12 increases from the inner surface of the first cladding 12 toward the outer surface thereof, this provides the following advantages as illustrated in FIGS. 4(a) and 4(b). Specifically, since the concentration of the light attenuating dopant in part of the first cladding 12 located near the core 11 through which the optical signal in the fundamental mode principally propagates is relatively low, this enables low attenuation of the optical signal in the fundamental mode. In contrast, since the concentration of the light attenuating dopant in part of the first cladding 12 located near the interface between the first cladding 12 through which the optical signal in the higher-order mode principally propagates, and the second cladding 13 is relatively high, this enables advantageous attenuation of the optical signal in the higher-order mode before and after reflection of the optical signal at the interface. Therefore, the above structure of the optical fiber 10 can reduce the mode interference between the fundamental mode and the higher-order mode.

When the wavelength range of the optical signal attenuated by absorption is narrow, such as when the light attenuating dopant with which the first cladding 12 is doped is a hydroxyl group (OH), an optical signal having, e.g., a wavelength in the 1300 nm band can be advantageously absorbed and attenuated. In contrast, when fiber identification is performed, absorption-induced attenuation of identification light propagating through the first cladding 12 and having wavelengths in the 1650 nm band and the 650 nm band is low. Thus, there is no problem in performing fiber identification. The difference between the loss of the optical signal and the loss of the identification light is preferably greater than or equal to 10 dB.

Next, a fabrication method for an optical fiber 10 according to this embodiment will be described.

The optical fiber 10 of this embodiment can be fabricated by drawing a preform 20 including a core forming portion 21, a first cladding forming portion 22 surrounding the core forming portion 21, a second cladding forming portion 23 surrounding the first cladding forming portion 22, and a support layer forming portion 24 (third cladding forming portion) surrounding the second cladding forming portion 23.

The preform 20 can be produced by chemical vapor deposition (CVD), vapor-phase axial deposition (VAD), or outside vapor phase deposition (OVD). In order to obtain the optical fiber 10, a process for producing the preform 20 may include a process step of introducing light attenuating dopant from the outer surface of the first cladding forming portion 22 into the first cladding forming portion 22 after the formation of the first cladding forming portion 22. When the light attenuating dopant is introduced from the outer surface of the first cladding forming portion 22 into the first cladding forming portion 22 as described above, the concentration of the introduced light attenuating dopant in part of the first cladding forming portion 22 located near the outer surface thereof is high, and the concentration of the introduced light attenuating dopant in part of the first cladding forming portion 22 located near the inner surface thereof is low. Specifically, examples of methods for doping the first cladding forming portion 22 with a hydroxyl group (OH) as the light attenuating dopant include a method in which, after the formation of the first cladding forming portion 22, the outer surface of the first cladding forming portion 22 is oxidized in a flame.

Figure 5:
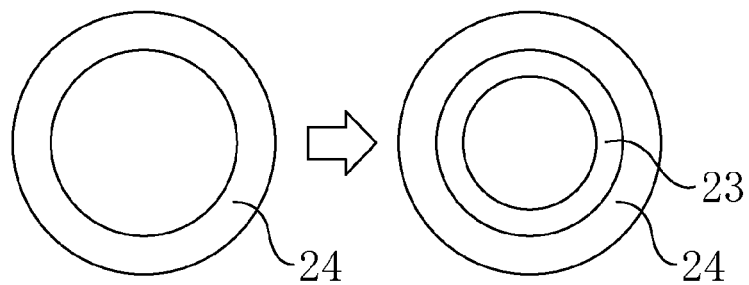
[FIG. 5] FIGS. 5($a$)-5($c$) are diagrams illustrating a method for producing a preform.
Figure 5:
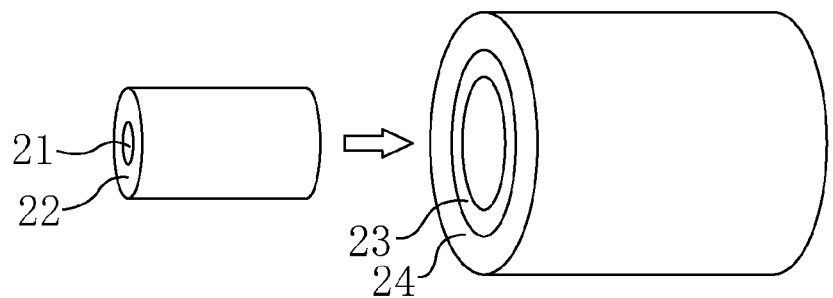
Figure 5:
Figure 5:
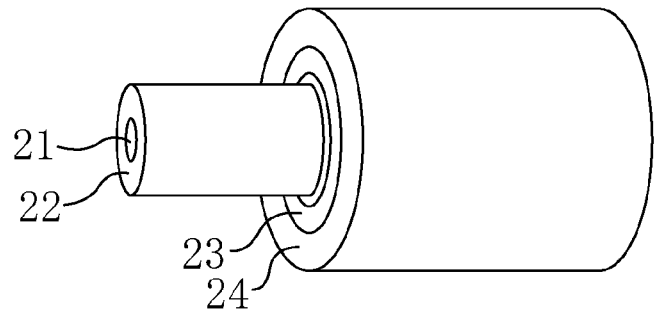
Figure 5:
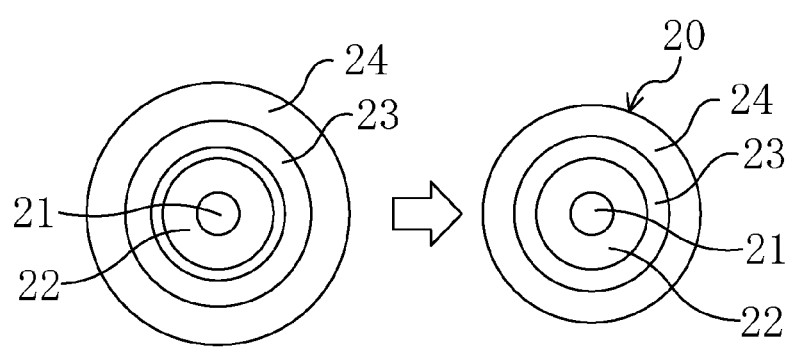

As illustrated in FIGS. 5, a rod-in-tube technique can be also used to produce the preform 20.

Specifically, as illustrated in FIG. 5(a), the second cladding forming portion 23 is deposited on the inner wall of the support layer forming portion 24 forming a quartz glass tube by modified chemical vapor deposition (MCVD). As illustrated in FIG. 5(b), a multilayer structure including the core forming portion 21 and the first cladding forming portion 22 is produced by CVD or VAD. The multilayer structure includes light attenuating dopant introduced from the outer surface of the first cladding forming portion 22 into the first cladding forming portion 22, and is inserted into the support layer forming portion 24 on which the second cladding forming portion 23 is deposited. As illustrated in FIG. 5(c), the multilayer structure, and the support layer forming portion 24 on which the second cladding forming portion 23 is deposited may be collapsed.

When the produced preform 20 is drawn, the furnace temperature is preferably, for example, 1800-2200° C., and the drawing speed is preferably, for example, 100-1000 m/min.

In this embodiment, the core 11, the first cladding 12, and the second cladding 13 are doped with dopant serving to increase the refractive index of the doped material, light attenuating dopant, and dopant serving to decrease the refractive index of the doped material, respectively, and the support layer 14 is made of pure quartz. However, the structures of the core 11, the first cladding 12, the second cladding 13, and the support layer 14 are not particularly limited to the above structures. When the first cladding 12 has a lower refractive index than the core 11; and the second cladding 13 has a lower refractive index than the first cladding 12, the optical fiber may have any other structure. The core 11, the first cladding 12, the second cladding 13, and the support layer 14 may be doped with other dopants as needed.

INDUSTRIAL APPLICABILITY

The present invention is useful for optical fibers each including a core, a first cladding, and a second cladding.

DESCRIPTION OF REFERENCE CHARACTERS

10 OPTICAL FIBER
11 CORE
12 FIRST CLADDING
13 SECOND CLADDING
20 PREFORM
21 CORE FORMING PORTION
22 FIRST CLADDING FORMING PORTION
23 SECOND CLADDING FORMING PORTION

The invention claimed is:

1. An optical fiber comprising:
a core;
a first cladding surrounding the core and having a lower refractive index than that of the core; and
a second cladding surrounding the first cladding and having a lower refractive index than that of the first cladding,
wherein the first cladding is doped with a light attenuating dopant so that a concentration of the light attenuating dopant in the first cladding increases from an inner surface of the first cladding toward an outer surface of the first cladding,
an average concentration of the light attenuating dopant in the first cladding is about 100-10000 ppm by mass and the light attenuating dopant is OH.

2. The optical fiber of claim 1, wherein the core is made of quartz doped with a dopant serving to increase a refractive index of a doped material.

3. The optical fiber of claim 1, wherein the first cladding is made of quartz doped with the light attenuating dopant.

4. The optical fiber of claim 1, wherein a ratio of an outer diameter of the first cladding to an outer diameter of the core is 2.9-5.5.

5. The optical fiber of claim 1, wherein the second cladding is made of quartz doped with a dopant serving to decrease a refractive index of a doped material.

6. The optical fiber of claim 1 further comprising:
a support layer surrounding the second cladding and having a higher refractive index than that of the second cladding.

7. The optical fiber of claim 6, wherein the support layer is made of pure quartz.

8. The optical fiber of claim 6, wherein:
in a refractive index profile along a diameter of a fiber cross section, the refractive indexes of the first cladding and the support layer are identical; when the refractive indexes are used as a reference, the refractive index of the core is above the reference; and the refractive index profile has a trench structure in which the refractive index of the second cladding is below the reference.

9. A method for fabricating the optical fiber of claim 1 by drawing a preform including a core forming portion, a first cladding forming portion surrounding the core forming portion, and a second cladding portion surrounding the first cladding forming portion, the method comprising:
forming the first cladding forming portion, and then introducing a light attenuating dopant from an outer surface of the first cladding forming portion into the first cladding forming portion.

* * * * *